(12) United States Patent
Wu et al.

(10) Patent No.: US 9,798,772 B2
(45) Date of Patent: Oct. 24, 2017

(54) USING PERSISTENT DATA SAMPLES AND QUERY-TIME STATISTICS FOR QUERY OPTIMIZATION

(71) Applicant: Oracle International Corporation, Redwood Shores, CA (US)

(72) Inventors: Zhe Wu, Mountain View, CA (US); Gabriela Montiel Moreno, Zapopan (MX); Jayanta Banerjee, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 288 days.

(21) Appl. No.: 13/893,047

(22) Filed: May 13, 2013

(65) Prior Publication Data

US 2014/0310260 A1    Oct. 16, 2014

Related U.S. Application Data

(60) Provisional application No. 61/811,126, filed on Apr. 12, 2013.

(51) Int. Cl.
*G06F 17/30*    (2006.01)

(52) U.S. Cl.
CPC .. *G06F 17/30442* (2013.01); *G06F 17/30277* (2013.01); *G06F 17/30424* (2013.01)

(58) Field of Classification Search
CPC ......... G06F 17/30463; G06F 17/30442; G06F 17/30277; G06F 17/30424
See application file for complete search history.

(56) References Cited

U.S. PATENT DOCUMENTS

| | | | |
|---|---|---|---|
| 6,370,524 B1* | 4/2002 | Witkowski | G06F 17/30451 |
| 7,676,418 B1* | 3/2010 | Chung | G06Q 10/06393 |
| | | | 705/36 R |
| 7,873,660 B1* | 1/2011 | Wong et al. | 707/781 |
| 7,882,121 B2* | 2/2011 | Bruno | G06F 17/30424 |
| | | | 707/690 |
| 8,433,701 B2* | 4/2013 | Sargeant et al. | 707/714 |
| 8,458,191 B2 | 6/2013 | Bhattacharjee et al. | |

(Continued)

OTHER PUBLICATIONS

Valle et al., "Page: A Distributed Infrastructure for Fostering RDF-Based Interoperability", dated Oct. 16, 2006, 8 pages.

(Continued)

*Primary Examiner* — Tarek Chbouki
(74) *Attorney, Agent, or Firm* — Hickman Palermo Becker Bingham LLP; Daniel D. Ledesma

(57) ABSTRACT

Techniques for storing and querying graph data in a key-value store are provided. A graph statement (e.g., an RDF graph statement) includes a plurality of values, at least two of which correspond to nodes in a graph. A key is generated based on the graph statement. The key may be generated based on concatenating hash values that are generated based on the plurality of values. The key-value store stores the key. The value that corresponds to the key may be a null or empty value. In response to a graph query (e.g., in SPARQL) that includes one or more query patterns, each of which includes one or more values, a key is generated based on the one or more values and sent to the key-value store, which returns one or more other keys, each of which is a superset of the generated key.

23 Claims, 7 Drawing Sheets

(56) References Cited

U.S. PATENT DOCUMENTS

| | | | |
|---|---|---|---|
| 2003/0084043 A1* | 5/2003 | Acharya et al. | 707/5 |
| 2004/0117396 A1* | 6/2004 | Avadhanam et al. | 707/101 |
| 2004/0225639 A1* | 11/2004 | Jakobsson | G06F 17/30463 |
| 2004/0260692 A1* | 12/2004 | Brill | G06F 17/3069 |
| 2005/0204141 A1 | 9/2005 | Sayers et al. | |
| 2008/0086444 A1* | 4/2008 | Yu | G06F 17/30477 |
| 2008/0120281 A1 | 5/2008 | Marceau et al. | |
| 2008/0154541 A1* | 6/2008 | Gemulla et al. | 702/181 |
| 2008/0222087 A1* | 9/2008 | Balmin et al. | 707/2 |
| 2009/0132474 A1 | 5/2009 | Ma et al. | |
| 2009/0292716 A1 | 11/2009 | Oliver et al. | |
| 2010/0036831 A1* | 2/2010 | Vemuri | G06F 17/30516 707/707 |
| 2010/0036862 A1 | 2/2010 | Das et al. | |
| 2010/0241644 A1 | 9/2010 | Jackson et al. | |
| 2010/0306591 A1* | 12/2010 | Krishna | 714/35 |
| 2011/0099174 A1 | 4/2011 | Chappell et al. | |
| 2012/0310916 A1* | 12/2012 | Abadi et al. | 707/713 |
| 2013/0066880 A1* | 3/2013 | Schramm | G01C 21/32 707/743 |
| 2013/0238667 A1 | 9/2013 | Carvalho et al. | |
| 2013/0268520 A1* | 10/2013 | Fisher | G06F 17/30477 707/723 |
| 2014/0019490 A1 | 1/2014 | Roy et al. | |
| 2014/0108414 A1* | 4/2014 | Stillerman | G06F 17/3048 707/741 |
| 2014/0244682 A1* | 8/2014 | Curtiss | G06F 17/30424 707/769 |
| 2014/0297621 A1* | 10/2014 | Hu et al. | 707/722 |
| 2014/0372090 A1* | 12/2014 | Lee et al. | 703/2 |

OTHER PUBLICATIONS

Neumann et al., "The RDF-3X Engine for Scalable Management of RDF Data", The VLDB Journal dated 2010, 24 pages.

Kulkarni, Prasad, "Distributed Sparql Query Engine Using MapReduce", Masters of Science University of Edinburh, dated 2010, 64 pages.

Harth et al., "Optimized Index Structures for Querying RDF from the Web", IEEE, dated 2005, 10 pages.

Faye, C. David, "A Survey of RDF Storage Approaches", ARIMA Journal vol. 15, dated Feb. 2012, 26 pages.

Ladwig et al., "Cumulus RDF: Linked Data Management on Nested Key-Value Stores", SSWS, dated 2011, 13 pages.

Harth et al., "Optimized Index Structures for Querying RDF from the Web", Proceedings of the Third Latin American Web Congress, IEEE, dated 2005, 10 pages.

U.S. Appl. No. 13/893,018, filed May 13, 2013, Office Action dated May 21, 2015.

* cited by examiner

USING PERSISTENT DATA SAMPLES AND QUERY-TIME STATISTICS FOR QUERY OPTIMIZATION

CROSS-REFERENCE TO RELATED APPLICATIONS; BENEFIT CLAIM

This application claims priority to U.S. Provisional Application No. 61/811,126, filed on Apr. 12, 2013, entitled, "Implementing Graph Data in a Key-Value Store," the entire contents of which are incorporated by reference as if fully disclosed herein under 35 U.S.C. §119(e).

This application is related to U.S. patent application Ser. No. 13/893,018 filed May 13, 2013, the entire contents of which are incorporated by reference as if fully disclosed herein.

FIELD

Embodiments relate to storing and querying graph data in a key-value store.

BACKGROUND

A database is an organized collection of data. The data is typically organized to model relevant aspects of reality in a way that supports processes requiring this information. A database model is a type of data model that determines the logical structure of a database and fundamentally determines in which manner data can be stored, organized, and manipulated. The most popular example of a database model is the relational model, which uses a table-based format. Other data models for databases include the Hierarchical database model, the Network model, the Object model, the Document model, and the Entity-relationship model.

For the past few decades, relational databases have been dominant for all large-scale data processing applications and remain dominant except in niche areas. The dominant database language is the standard SQL for the relational model, which has influenced database languages for other data models.

In recent years, NoSQL ("Not only SQL") databases have gained popularity as highly available, scalable solutions to process massive amounts of data produced and consumed under an unreliable environment. A NoSQL database provides a mechanism for storage and retrieval of data that use looser consistency models than traditional relational databases in order to achieve horizontal scaling and higher availability. For example, NoSQL databases do not require fixed table schemas. NoSQL databases are mainly designed for processing "big data" over distributed nodes in a cluster as an alternative to using a single, highly available, and high-end server system. Big data is a collection of data sets so large and complex that it becomes difficult to process using on-hand database management tools or traditional data processing applications.

NoSQL database management systems are useful when working with a huge quantity of data when the data's nature does not require a relational model. The data can be structured, but NoSQL is used when what really matters is the ability to store and retrieve great quantities of data rather than the relationships between data elements. This organization is particularly useful for statistical or real-time analysis of growing lists of elements (such as Twitter posts or the Internet server logs from a large group of users).

A NoSQL database may distribute data loading and querying over multiple storage nodes of a cluster. Each storage node maintains a local index, lexically ordered by the key, which is a variable length character string. The value part of a key-value pair may be a character string, an integer, or some other primitive data type. A NoSQL database can be used to efficiently find all key-value pairs given a specific key.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
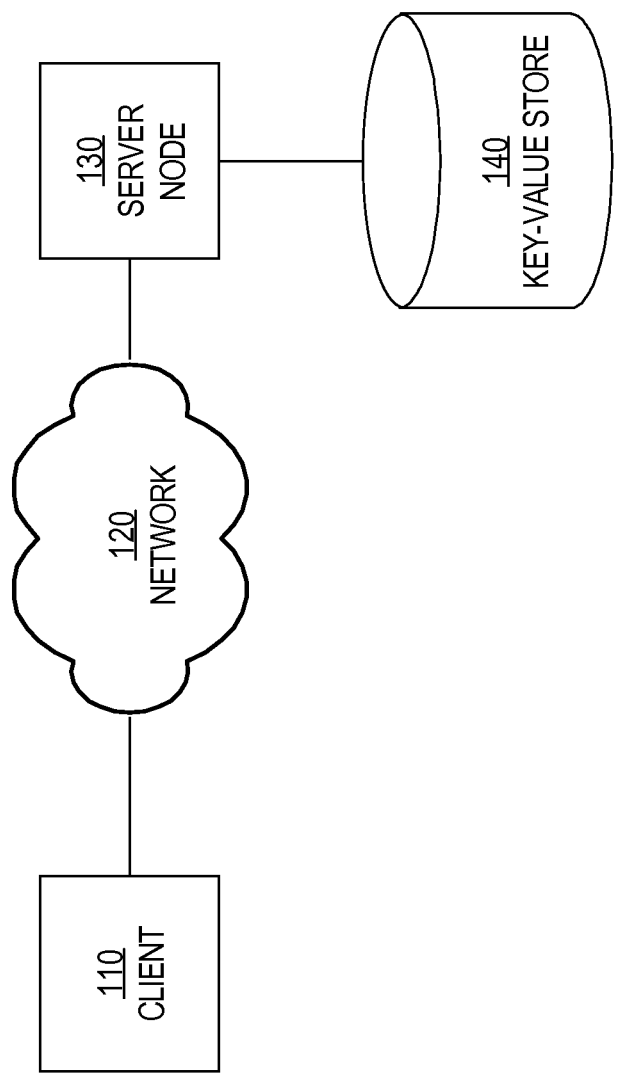
FIG. 1 is a block diagram that depicts an example system for storing and querying graph data in a key-value store, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for storing graph data in a key-value store. Graph data comprises multiple graph statements (or expressions) and a single graph statement comprises multiple values that correspond to multiple components or attributes of a graph. For example, if a graph statement is an RDF graph statement, then the multiple attributes may be subject, predicate, and object. Such a triple of graph values defines a two-node graph, where the predicate value indicates a relationship between the subject and object values. A graph statement may also have an attribute for a graph name.

A key is generated for each graph statement and stored in a key-value-store. The key may be a concatenation of the graph values or hash values generated based on the graph values. In one approach, multiple keys are generated based on a single graph statement to allow efficient querying of the key-value store.

Techniques are also provided for querying graph data that is stored in a key-value store. A graph query includes one or more query patterns, each of which includes one or more graph values. In one approach, a key pattern is selected from among multiple key patterns in response to one or more graph values in each query pattern within a graph query. Responses to the graph query are based on these key patterns.

Techniques are also provided for efficient querying of graph data or any type of data, regardless of the data model. Such techniques involve querying a series of one or more data samples of a target data set in order to estimate cardinalities of query patterns or of predicates in the initial query. After processing the patterns or predicates against one or more data objects, a test is performed to determine whether to process the patterns or predicates against another set of one or more data objects in order to obtain a more accurate cardinality estimate.

RDF

One example data model for graph data is Resource Description Framework (RDF). RDF is a family of World Wide Web Consortium (W3C) specifications originally designed as a metadata data model. RDF has come to be used as a general method for conceptual description or modeling of information that is implemented in web resources, using a variety of syntax notations and data serialization formats.

In the RDF data model, data is modeled as labeled and directed graphs, represented as a set of triples. The nodes in the graph are used to represent two parts of a given triple, and the third part is represented by a directed link that describes the relationship between the nodes. In the context of an RDF expression or statement, the two nodes are referred to as "subject" and "object" and the link describing the relationship is referred to as "predicate".

The subject and object of a particular RDF expression may be resources that are identified by Uniform Resource Identifiers (URIs). A predicate may be also represented by a URI. A URI includes a prefix that may refer to an electronic location on the Internet, or may refer to a namespace within a database system. For example, standard prefixes "rdf:", "rdfs:" and "xsd:" are generally defined as follows:

Prefix "rdf:"; namespace URI: http://www.w3.org/1999/02/22-rdf-syntax-ns#

Prefix "rdfs:"; namespace URI: http://www.w3.org/2000/01/rdf-schema#

Prefix "xsd:"; namespace URI: http://www.w3.org/2001/XMLSchema#

Prefixes, such as "ogc:" and "edb:" may be defined within a database system to refer to a personal or other namespace in the system.

Instead of a resource, the object of a particular RDF expression may be a literal of some well-defined data type, such as a string, integer, float, double, Boolean, date, and time.

SPARQL, which stands for SPARQL Protocol and RDF Query Language, is an example of an RDF query language. SPARQL is based on triple graph pattern matching and was standardized by the W3C in January 2008. In a SPARQL triple graph pattern, any or all of the subject, object, and predicate may be a variable. (See "SPARQL Query Language for RDF," W3C Recommendation 15 Jan. 2008, found at the time of writing this specification in the folder TR/rdf-sparql-query/ at the domain www.w3.org, the entirety of which is incorporated by reference herein.) The W3C recommendation for SPARQL indicates that "[a] basic graph pattern matches a subgraph of the RDF data when RDF terms from that subgraph may be substituted for the variables and the result is RDF graph equivalent to the subgraph."

A basic SPARQL query may include a SELECT clause, a WHERE clause, and one or more query variables. A SPARQL query may also include one or more PREFIX bindings, a FILTER clause, a FROM clause, a FROM NAMED clause, a GRAPH clause, an ORDER BY clause, etc. A simple example SPARQL query is as follows:

PREFIX rdf: <http://www.w3.org/1999/02/22-rdf-syntax-ns#> select ?company where {?company rdf:type <ns:DatabaseCompany>}

This example query selects all RDF triples with subjects that have the relation "<rdf:type>" to the object resource "<ns:DatabaseCompany>". Note that the actual prefix definition for "ns:" is omitted from the above query for brevity. A result generated by processing this example query may be one or more URIs, each identifying a different company that satisfies the search criteria. The expression within the WHERE clause of the example SPARQL query is referred to as a query pattern. A SPARQL query may include multiple query patterns and constructs, such as OPTIONAL, UNION, etc.

While RDF is one example data model that may be followed for the data that is stored in a K/V store, embodiments are not limited to that data model. Other graph data models may be used, such as Meta Content Framework (MCF) and the Property Graph Model (a description of which is found at https://github.com/tinkerpop/blueprints/wiki/Property-Graph-Model).

System Overview

FIG. 1 is a block diagram that depicts an example system 100 for storing and querying graph data in a key-value store, in an embodiment. System 100 includes a client 110, a network 120, a server node 130, and a K/V store 140.

Client 110 is a computing device that is configured to send requests to load graph data into K/V store 140 and/or to retrieve graph data from K/V store 140. Examples of client 110 include a desktop computer, a laptop computer, a tablet computer, and a mobile (or "smart") phone. Client 110 may include software (such as a web browser or dedicated software application) that, when executed on client 110, is configured to generate and send the requests and cause any results of the requests to be displayed on a display screen of client 110. Although only one client 110 is depicted in system 100, system 100 may include many clients.

Client 110 is communicatively coupled to server node 130 via network 120. Network 120 may be implemented by any medium or mechanism that provides for the exchange of data between client 110 and server node 130. Non-limiting examples of network 120 include one or more Local Area Networks (LANs), one or more Wide Area Networks (WANs), the Internet, or any combination thereof.

K/V store 140 is persistent storage that stores graph data as key-value pairs. An example of K/V store 140 is a NoSQL database. Given a key (e.g., from server node 130), K/V store 140 looks up a corresponding value and returns that value. The key supplied to K/V store 140 may not be an entire key. Instead, the key may be a prefix of an actual key in K/V store 140. Thus, K/V store 140 may be configured to retrieve multiple keys and multiple values based on a key prefix. For example, if a key prefix is "234" and multiple keys start with "234", then K/V store 140 would return the multiple keys and the values that correspond to the multiple keys.

In an embodiment, K/V store 140 is configured to receive a batch or set of keys in a single request and return values that correspond to the indicated keys. The values may be returned to the requestor in one or more distinct messages from K/V store 140.

In an embodiment, K/V store 140 stores one or more associative arrays, each of which is a collection of key-value pairs. Each key in an associative array may be unique. Different data structures may be used to implement an associative array, including a hash table, a B-tree, or a directly addressed array. Embodiments are not limited to any particular technique for storing key-value pairs.

Although only one K/V store 140 is depicted in system 100, system 100 may include multiple K/V stores, each connected to one or more server nodes (such as server node 130). Thus, a particular data set may be divided or partitioned into multiple subsets or partitions, each subset being stored in a different K/V store. Server node 130 (and/or multiple other server nodes, not depicted) stores storage location data that indicates where certain graph data is stored. For example, server node 130 may store a set of mappings, each mapping identifying (1) a range of keys and (2) a K/V store that stores the keys that fall into that range. In an embodiment, each mapping identifies a unique and non-overlapping range relative to other ranges identified in the set of mappings.

Server node 130 is a computing device that is configured to process requests from client 110. Such requests may be load requests to load graph data into K/V store 140. Additionally or alternatively, such requests may be retrieve requests to query graph data stored in K/V store 140. A load request may include graph data for multiple graphs. Similarly, a retrieve request may be for any graphs that satisfy the search criteria indicated in the retrieve request.

As indicated previously, although only one server node 130 is depicted in system 100, system 100 may include multiple server nodes. Each server node is communicatively coupled to one or more K/V stores. If system 100 includes multiple server nodes, then each server node 130 may be configured to transfer requests from one server node to another, depending on which server node is connected to the K/V store that stores the relevant graph data.

Storing Graph Data in a Key-Value Store

Figure 2:
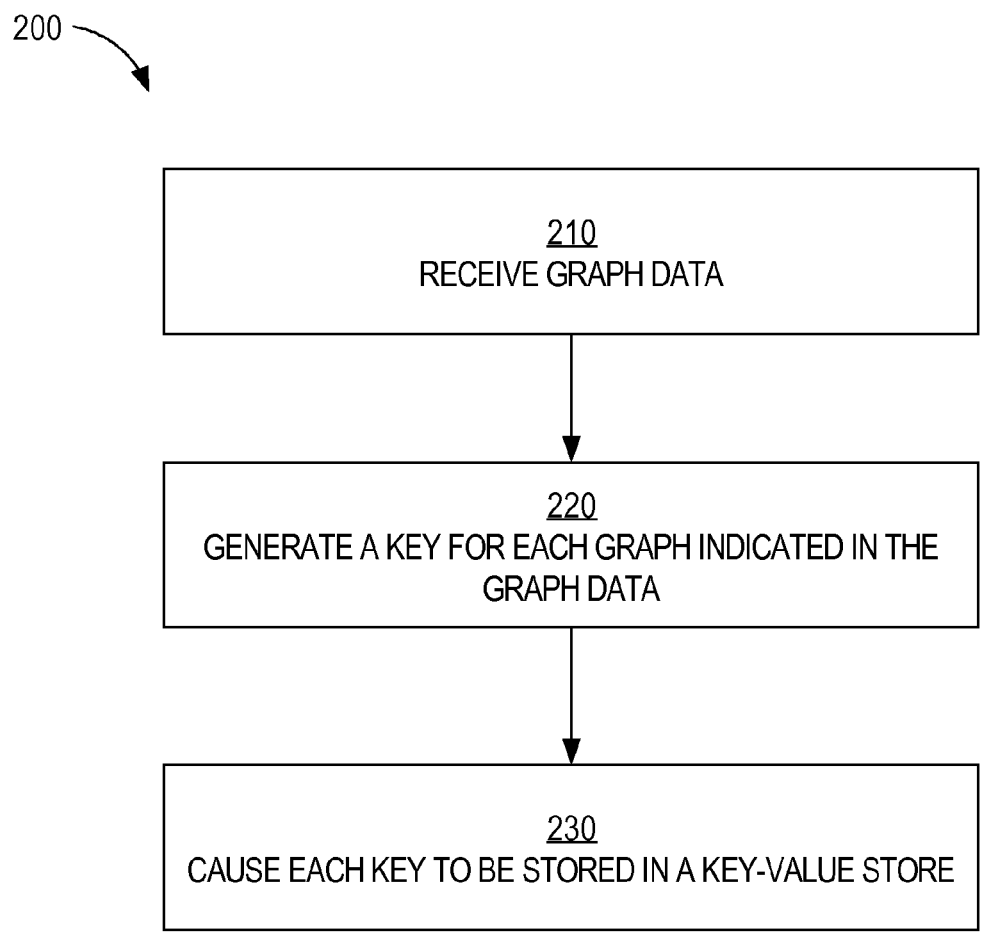
FIG. 2 is a flow diagram that depicts a process for storing graph data in a K/V store, in an embodiment.

FIG. 2 is a flow diagram that depicts a process 200 for generating a key for a graph, in an embodiment. Process 200 may be performed by server node 130.

At block 210, graph data is received. The graph data may be received from a client 110. The graph data includes data for one or more graph statements. Block 210 may correspond to a bulk load operation where the graph data includes hundreds, thousands, or even millions of graph statements.

Each graph statement indicated in the graph data comprises multiple values, each corresponding to a different graph component or attribute. A single graph statement includes information about multiple (at least two) nodes of graph and about at least one edge that connects the two nodes. For example, if the graph data is RDF graph data, then the graph attributes are at least subject, predicate, and object. A graph statement indicated in the graph data may also include a graph name (or group ID). Multiple graph statements may be associated with the same graph name (or group ID). In this way, multiple graphs may be grouped into (or belong to) a single group. Thus, graph data for a particular graph statement may include four values: one for the subject, one for the predicate, one for the object, and one for the graph name.

In an embodiment, all graph statements have the same number of graph values and same type of graph components. Alternatively, some graph statements indicated in graph data may have a certain number of graph values (e.g., four) while other graph statements indicated in the graph data may have a different number of graph values (e.g., three).

At block 220, a key is generated for each graph statement indicated in the graph data. A key may be generated in one of multiple ways. One possible way to generate a key is to encode the values of graph statement in the key itself. An example of such encoding is concatenation, which involves appending one value to another value. Concatenation may involve adding one or more delimiters before appending a value to another value. Example delimiters include a space character, an underscore character ("_"), and hyphen character ("-"), or another other byte or non-byte (e.g., 9 bits) value. For example, a graph statement may comprise the following RDF graph values: "John", "is a father of", "Mary", where "John" is the subject, "is a father of" is the predicate, and "Mary" is the object. Concatenating these graph values may result in the following key: John_isafatherof_Mary. Before concatenation is performed, the values of a graph statement may be first ordered if the values in the graph statement are not in any particular order and order is important.

In an embodiment, a graph value is a uniform resource identifier (URI). In contrast, relational databases use keywords instead of URIs. However, keywords may be ambiguous. For example, "jaguar" can mean one of many different things. URIs, on the other hand, are not (or at least less) ambiguous. Examples of graph values for a single graph statement are the following (corresponding to the graph components subject, predicate, and object, respectively):

<http://www.oracle.com/> <http://www.w3.org/1999/02/22-rdf-syntax-ns#type> <ns:DatabaseCompany>

An English "translation" of this graph statement is "Oracle is a type of database company." While this example graph statement includes primarily URIs, other graph statements may include strings, integers, or other data types.

If the graph values are fixed length numbers such as in many graph models (e.g., property graphs), then encoding an individual graph value is not required. Such graph values can be directly concatenated to compose the key part of a key-value pair. Additionally, some implementations may choose to store graph values (e.g., in the object part of a triple) that are large (such as a textual document of thousands of characters) in the value part of a key-value pair, while storing just an encoding (or a short prefix of the text) as the object component inside the fully composed key. Such an approach is useful for handling queries based on textual pattern matching.

Hashing Graph Values

In an embodiment, instead of including the values of a graph statement directly in a key, a hash value is first created for each graph value. For example, given the example graph statement above (i.e., "John" "is a father of" "Mary"), a hash value is generated for "John", a hash value is generated for "is a father of", and a hash value is generated for "Mary." (If the graph values are URIs, then a hash value is generated for each URI.) Any technique for generating a hash value may be used. The hash values may be much smaller than the corresponding values. For example, a graph value may be 50 bytes or more while a hash value may only be 8 or 16 bytes.

After hash values are created for a single graph statement, the hash values may then be concatenated together to generate a key for the graph statement.

If process 200 involves generating hash values and keys based on the hash values, then block 230 may also involve generating a mapping of graph values (e.g., URIs) to their corresponding hash values. Such a mapping is referred to herein as a "hash map." The hash map may also be stored in a K/V store, such as K/V store 140. The hash map may be stored in a data structure (e.g., associative array) that is separate from the data structure(s) that stores the graph data. Thus, the key in each key-value pair indicated in the hash map may be a graph value (e.g., URI) and the value in each key-value pair may be the corresponding hash value. Additionally, the hash map may be stored on the same device that generates the keys, such as server node 130. In this way, when the mapping is used during query processing, an additional query to the K/V store for the mapping is not necessary to decode the returned keys.

In an embodiment, before a hash value is generated for a particular graph value, the hash map is checked to determine whether the hash map already contains a hash value for the particular graph value. If not, then the hash value is generated for the particular graph value. Otherwise, the hash value is read from the appropriate entry in the hash map and used to generate a key.

Storing the Key

At block 230, the key is caused to be stored in a K/V store. Block 230 may involve server node 130 sending the key to K/V store 140, which stores the key. The key may be accompanied by a corresponding value. In an embodiment, because all information about a graph statement (whether a triple or a quad) is encoded in a key, an empty value or "NULL" may be stored as the value of a key-value pair.

Multiple Keys for a Single Graph

In an embodiment, multiple keys are generated for a single graph (or graph statement) indicated in graph data received in block 210. Each key of the multiple keys may begin with a different value of the multiple values that are associated with the graph. For example, if a graph comprises four values, then at least four keys are generated, each key beginning with a value that is (or is based on) a different one of the four values.

In a related embodiment, keys are generated based on what queries will likely target in the future. For example, in the context of RDF, if it is known that queries on the graph data will always at least include a value for the subject component and, optionally, one or more other values, then multiple keys may be generated, each one beginning with a value that is (or is based on) the subject value. For example, in the context of RDF where graph components or attributes are S, P, and O, a key may be generated based on two orderings of graph values: (S, P, O) and (S, O, P).

Key Patterns

In a related embodiment, for a single graph statement (e.g., an RDF expression), a key is generated for each key pattern in a set of key patterns. A key pattern is certain ordering of graph components or attributes. The set of key patterns may be determined and established by an administrator or other user. The set of key patterns may be chosen based on all possible query patterns. In the context of RDF, graph statements are triples (or quads, if graph name is considered a graph component). If graph statements are triples, then a query against stored graph data may be one of 3!=6 different combinations. 3! is the number of permutations of three distinct items. If graph statements are quads, then a query against stored graph data may be one of 4!=24 different combinations. However, 24 key patterns do not need to be established. If 24 key patterns are established, then 24 keys would be generated for a single graph statement. Instead, a judiciously selected small subset of all possible combinations of graph components may be established as key patterns. The small subset selection is described in more detail below.

In the context of RDF, an example set of six key patterns is the following: GPSO, SOGP, SGOP, OGPS, POSG, and PSOG, where 'G' refers to the graph name, 'P' refers to the predicate component, 'S' refers to the subject component, and 'O' refers to the object component. Thus, if six key patterns are used to generate keys, then six keys are generated for each RDF expression or statement. For example, given the graph statement "<http://www.oracle.com/> <ns:DatabaseCompany> <rdf:type>" with graph name "<http://www.softwareCompanies.com>", six keys may be generated, one for each of the following permutations:

Key 1—GPSO:
<http://www.softwareCompanies.com> <rdf:type> <http://www.oracle.com/>
<ns:DatabaseCompany>
Key 2—SOGP
<http://www.oracle.com/> <ns:DatabaseCompany>
<http://www.softwareCompanies.com> <rdf:type>
Key 3—SGOP
<http://www.oracle.com/> <http://www.softwareCompanies.com>
<ns:DatabaseCompany> <rdf:type>
Key 4—OGPS
<ns:DatabaseCompany> <http://www.softwareCompanies.com> <rdf:type>
<http://www.oracle.com/>
Key 5—POSG
<rdf:type> <ns:DatabaseCompany> <http://www.oracle.com/>
<http://www.softwareCompanies.com>
Key 6—PSOG
<rdf:type> <http://www.oracle.com/> <ns:DatabaseCompany>
<http://www.softwareCompanies.com>

In an embodiment, each key is preceded by a small number that distinguishes one key pattern from each other established key pattern. For example, an 8-bit long integer may be used to distinguish all the GSPO permutations, as well other types of information that may be kept in the key-value store. For example, given the above six example key patterns, keys that are generated based on the GPSO key pattern may be preceded by a "1" (or 8 bits that are equivalent to the value "1"), keys that are generated based on the SOGP key pattern may be preceded by a "2", keys that are generated based on the SGOP key pattern may be preceded by a "3", keys that are generated based on the OGPS key pattern may be preceded by a "4", keys that are generated based on the POSG key pattern may be preceded by a "5", keys that are generated based on the PSOG key pattern may be preceded by a "6".

The judicious selection of the permutations to keep is based on the fact that some permutations are redundant. For quads, there are 4! or 24 permutations possible. Of these 24, six start with G: GPSO, GPOS, GSOP, GSPO, GOPS, GOSP. Several of these permutations are entirely unnecessary. For example, GSPO can be eliminated. If the query included values for all four components, then any of key patterns 1-6 listed above (including the GPSO permutation) may be used. If the query included the first three components GSP, then the GPSO permutation may be used. If the query included the first two components GS, then the SGOP permutation may be used. Finally, if the query included only the first component G, then the GPSO permutation may be used. This line of reasoning eliminates many permutations. Additionally, based on the frequency of various types of queries in a query workload, additional permutations may also be dropped.

Querying Graph Data Stored in a Key-Value Store

Once graph data is stored in a key-value store, mechanisms need to be in place to receive a graph query and retrieve keys based on the query and a partial key or key prefix. A graph query is a query that targets graph data. The graph query includes one or more query patterns, each of which identifies zero or more graph values for a graph statement. For example, a query pattern may include a value for the subject component but no value for the predicate, object, and graph components. A single query pattern is used to identify one or more graph statements that include the zero or more graph values. Specifically, a single query pattern is used to generate a partial key that may be used to identify all keys that begin with the partial key. A query pattern that does not include any graph values may indicate that all keys from the key-value store are to be retrieved.

Figure 3:
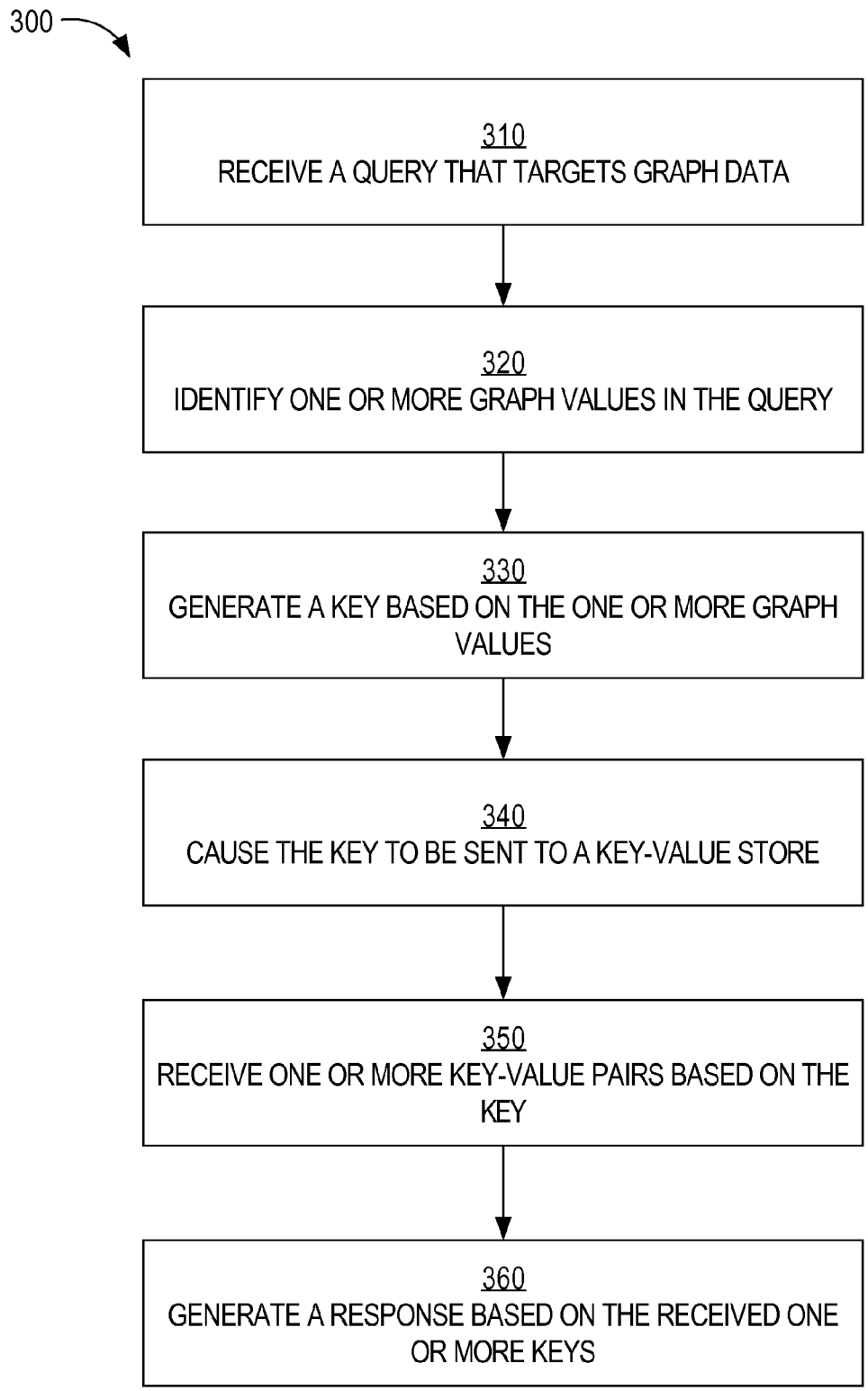
FIG. 3 is a flow diagram that depicts a process for querying graph data that is stored in a K/V store, in an embodiment.

FIG. 3 is a flow diagram that depicts a process 300 for querying graph data that is stored in a K/V store, in an embodiment. Process 300 may be performed by server node 130.

At block 310, a graph query is received. A graph query includes one or more query patterns. The graph query may originate from a client, such as client 110. Alternatively, the graph query may be automatically issued (e.g., by server node 130). For example, an administrator or other user may configure server node 130 such that a graph query is run periodically and, thus, may be automated. Each automatically-issued graph query may be identical or may be different based on configuration data established by the user.

An example graph query that includes four query patterns is the following:

| :G1 | {?s1 | :fof | :Mary} |
|---|---|---|---|
|  | {?s1 | :hobby | ?h} |
|  | {?s2 | :sisterof | ?s1} |
|  | {?s2 | :age | ?age} |

Processing this example graph query against graph data stored in a key-value store will provide results that identify: (1) the father of Mary; (2) hobbies of Mary's father; (3) the sister(s) of Mary's father; and (4) the age of the sister(s) of Mary's father. Each of the four query patterns in the example graph query is to be found in association with the graph name "G1". Although simple strings are used to denote the graph values (e.g., "fof" and "Mary"), URIs may be used in other example graph queries.

At block 320, one or more graph values are identified in the graph query. Given the above example graph query, graph values "fof" (shorthand for "father of") and "Mary" are identified as the predicate and object, respectively, for the first query pattern, graph value "hobby" is identified as the predicate for the second query pattern, graph value "sisterof" is identified as the predicate for the third query pattern, and graph value "age" is identified as the predicate for the fourth query pattern.

At block 330, a key is generated based on the one or more values identified in block 330. Given the above example graph query, four keys are generated, one for each of the four query patterns.

Key Patterns

In an embodiment, in response to identifying one or more graph values in a graph query, a key pattern is selected from among multiple key patterns. For example, in the context of RDF, given the six key patterns referenced above (i.e., GPSO, SOGP, SGOP, OGPS, POSG, and PSOG), if a graph query includes graph values for the subject component and the predicate component, then a key pattern that begins with one of the subject component and the predicate component and is followed by the other of the subject component and the predicate attribute is selected. If a graph query includes multiple query patterns, then a key pattern may be selected for each query pattern.

Figure 4:
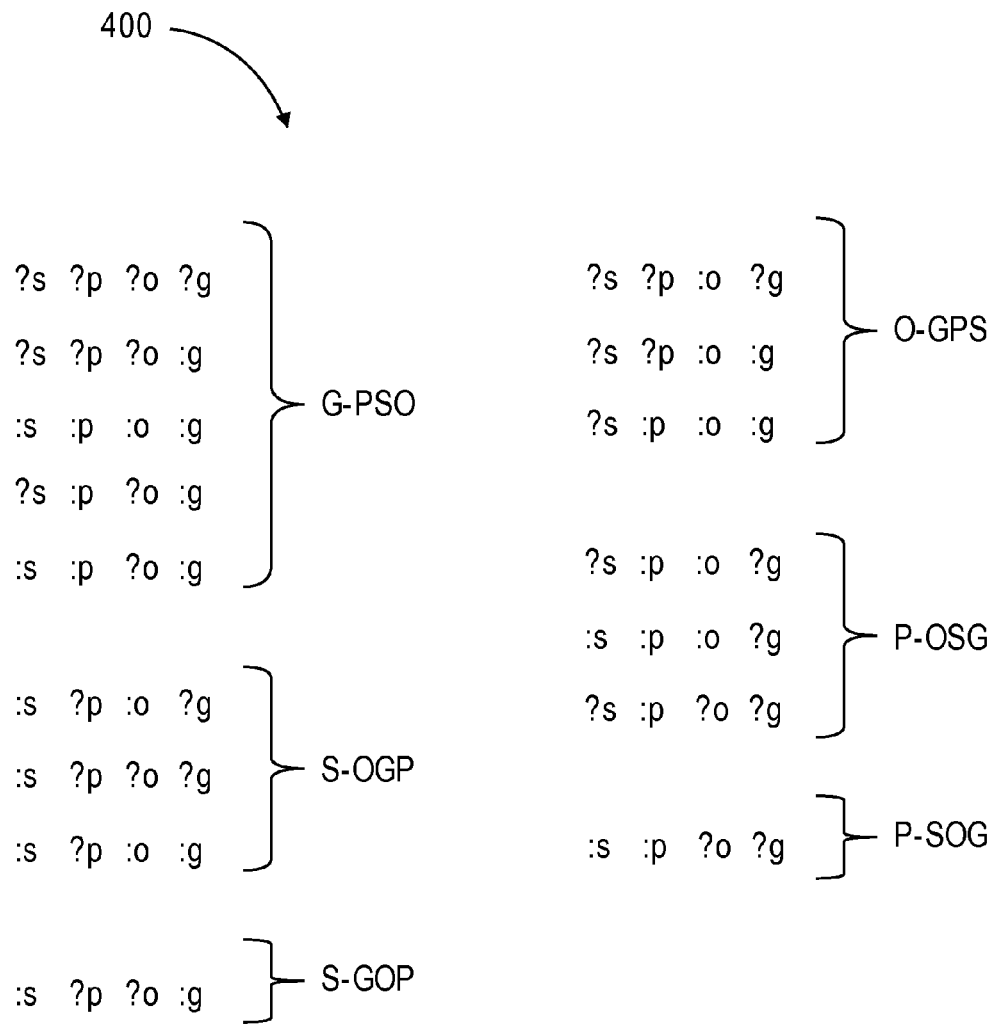
FIG. 4 is a diagram that depicts an example mapping of RDF query patterns to established key patterns, in an embodiment.

FIG. 4 is a diagram that depicts an example mapping 400 of RDF query patterns to established key patterns, in an embodiment. As mapping 400 indicates, "?x" indicates the graph component 'x' (which is one of the subject component, predicate component, object component, or name component) is a variable and ":x" indicates that the graph component 'x' is a specific value (such as a URI). Although mapping 400 indicates a mapping of all possible RDF query pattern quads to key patterns, other embodiments may include a strict subset of theoretically possible graph query patterns to key patterns. Such embodiments may be used if it is known that queries against graph data will not include certain query patterns.

In an embodiment, multiple key patterns may be used to generate different keys. For example, a query pattern that includes only a value for the subject component may be matched against key patterns SOGP and SGOP. As another example, a query pattern that includes values for the subject, predicate, and object components but not the graph component may be matched against key patterns POSG and PSOG. Even though FIG. 4 indicates that such a query pattern should use the POSG key pattern to generate a key for the query pattern, the PSOG key pattern may be used to generate a key for the query pattern.

Being able to use multiple key patterns may be useful if access to different sets of keys that are organized by key pattern may be different. For example, keys that are stored based on the POSG key pattern may be stored on one disk or storage medium while keys that are stored based on the PSOG key pattern may be stored on another disk. If the disk that stores keys based on the POSG key pattern is experiencing slow response times, then server node 130 may determine to use the PSOG key pattern to generate a key based on that key pattern.

Given the example above where the query includes a subject component and a predicate component, the key pattern of PSOG may be used to generate a key where the predicate component is the leading component and the subject component is a minor component.

Given the above example graph query, the key pattern OGPS is selected for the first query pattern (since only the subject ('S') component is missing). The key pattern GPSO is selected for second, third, and fourth query patterns because that is the only key pattern that begins with GP or PG, which are the known graph components for those query patterns.

If hash values are used to generate the key, then each graph value indicated in the graph query is used to look up, in the hash map, a hash value that corresponds to the graph value. At the time of receipt of the query, the hash map (or a portion thereof) may be available in memory of the device (in which the lookup is relatively fast) where block 330 is performed or may need to be retrieved from storage that is separate from the device, such as K/V store 140. Alternatively still, a request that includes the one or more graph values of the query may be sent to K/V store 140, which performs the lookup and returns the corresponding hash value(s). Alternatively still, K/V store 140 may include a processor that is configured to generate a key based on the hash value(s) that K/V store 140 identifies based graph value(s) received from server node 130.

At block 340, the key is sent to a key-value store, such as K/V store 140. Any communication protocol, whether an industry standard or proprietary protocol, may be used to transmit the generated key to K/V store 140.

At block 350, one or more key-value pairs are received from the key-value store. Because the value portion of the key-value pairs does not indicate anything of importance, the value portion may be ignored by the entity that performs block 350.

If the keys in the key-value pairs are based on hash values, then block 350 may involve causing the hash values indicated in each returned key to be translated using the hash map that associates graph values (e.g., URIs) with their corresponding hash values.

At block 360, a response to the query is generated based on the keys that are received in block 350. If translation occurred in block 350, then the translated graph values are used to generate the response to the query.

Cost-Based Query Optimization

In relational databases, cost-based optimization determines an optimal permutation of predicates and sub queries of a query to minimize total cost of execution of that query. Cost-based optimization usually requires maintaining an up-to-date set of statistics about the stored data, its indexes, and data distribution, such as a histogram, min/max values, and number of distinct values. With meaningful statistics and accurate cost estimation, the chosen relational query execution plans are usually quite reliable and optimal. However, unlike relational databases, graph (e.g., RDF) queries, stated in a query language such as SPARQL, require a large number of self joins. With RDF dataset being a collection of triples (or quads), statistics on the three individual components (organized into columns in a relational database) of the triple set are not especially meaningful. Additionally, other database management systems, such as key-value databases, support only a limited set of operations and do not support a statistics gathering utility. A challenge, then, is to create an efficient execution plan for RDF queries without the benefit of pre-computed statistics.

A purpose of a graph query optimizer then may be to determine a best permutation of self joins, the type of join operation (e.g., nested loop join or hash join), and an appropriate key structure (e.g., permutation of G, S, P, O) to use for a self join.

Persistent Data Samples for Query Optimization

As noted previously, a graph query may include multiple query patterns. Because of the multiple query patterns, the graph query may be executed in one of multiple ways. Each different way to execute a graph query is represented by an execution plan that a query engine generates for the graph query. Each execution plan represents a different ordered set of operations to perform to generate a valid result for the graph query. For example, each execution plan has a different join permutation, involving join order and/or join method (such as nested loop join vs. hash join). However, different execution plans may vary greatly with respect to the time required to execute the execution plans.

In an embodiment, multiple query patterns are processed against a series of one or more data samples of a particular data set. A data sample is a strict subset of the particular data set. For example, a first data sample for a particular data set may be 0.1% of the particular data set; a second data sample for the particular data set may be 1% of the particular data set; and a third data sample (if one exists) for the particular data set may be 5% of the particular data set.

A data sample may be generated in one of multiple ways. For example, random (or nearly random) key-value pairs in a key-value store (e.g., K/V store 140) may be selected for a data sample. As another example, every $100^{th}$ key-value pair in a key-value store may be selected for a data sample. As another example, the first N key-value pairs in a key-value store may be selected for a data sample. Different data samples may be generated in different ways.

By processing a set of query patterns against a data sample, the query engine may make an estimate of the actual cardinality of each query pattern in the set. The larger the data sample, the more accurate the cardinality estimate becomes for the query pattern relative to the entire data set. However, the larger the data sample, the longer it takes to generate the cardinality estimates and the more space is required to store the data sample.

Therefore, in an embodiment, the query patterns of a graph query are first processed against a data sample that is smallest, or at least not the largest. It is then determined whether the query patterns of the query are to be processed against another data sample (such as the next larger data sample). This determination may be based on one or more criteria. The one or more criteria may be a certain amount of time and/or cardinality of the query patterns. For example, if it took less than three seconds to determine the cardinality of the query patterns relative to the first data sample, then the query patterns are processed against a second (e.g., larger) data sample.

The "cardinality" of a query pattern refers to the number of key-value pairs that satisfy the query pattern. For example, the cardinality of the query pattern "{?s1 :fof :Mary}" should be at most one since a person only has one father, while the cardinality of "{?company <rdf:type> <ns:PublicCompany>}" may be relatively high if a key-value store contains information about many public companies.

Additionally or alternatively, if at least half of the query patterns have cardinalities greater than a certain threshold (e.g., five), then the query patterns are not processed against another data sample. Instead, the cardinalities are used to select the "cheapest" execution plan from among the multiple execution plans.

Alternatively, only those query patterns that have a cardinality below a particular threshold are processed again against another (e.g., larger) data set. Thus, for example, if one of four query patterns that were processed against a first data sample has a cardinality above a particular threshold (e.g., six), then only the other three query patterns are processed against a second data sample that is different (e.g., larger) than the first data sample.

Running a query pattern against different data samples allows a graph query optimizer to incrementally improve the accuracy in estimation, and finally derive the best execution plan that minimizes the cost of executing a graph query against the whole data set stored in the database (or key-value store).

In an embodiment, a different set of one or more criteria is used after the first data sample is scanned/searched than is used after the second data sample is scanned/searched. For example, after processing query patterns against a first data sample, a cardinality test is used to determine whether to process one or more of the query patterns against a second data sample. After processing the one or more query patterns against the second data sample, a time test and/or a cardinality test (which may have a different threshold than the previous cardinality test) are used to determine whether to process one or more of the one or more query patterns against a third data sample (if there is a third data sample).

In some situations, repeatedly searching against different (e.g., increasing) data samples may not yield significantly different results. Thus, second and subsequent searches may be considered useless. In an embodiment, a comparison between results of two searches (using a query pattern) against two different samples is used to determine whether to perform a search against a third (or subsequent) data sample. For example, if the selectivity of a query pattern relative to a first data sample is 1% and the cardinality of the query pattern relative to a second data sample is 1% (or within a certain range, e.g., +/−0.2%), then a search against a third data sample (if one exists) using the query pattern is not performed.

In an embodiment, the data samples are stored in the K/V store (e.g., K/V store 140) that also stores the data set from which the data samples were generated. Alternatively, a server node (e.g., server node 130) stores one or more data samples, each of which may be relatively small and, therefore, small enough to fit into memory or storage of the server node.

In an embodiment, if a data sample is stored in a K/V store, then the data sample is identified based on a data set identifier that distinguishes the data sample from (1) other data samples and (2) the data set from which the data samples were generated. For example, server node 130 sends, to K/V/ store 140, (1) a data sample ID and (2) a key generated based on the key pattern G-PSO where the graph values are only for graph components G and P. The data sample ID may be encoded in the key.

Graph Query Optimizer

Figure 5:
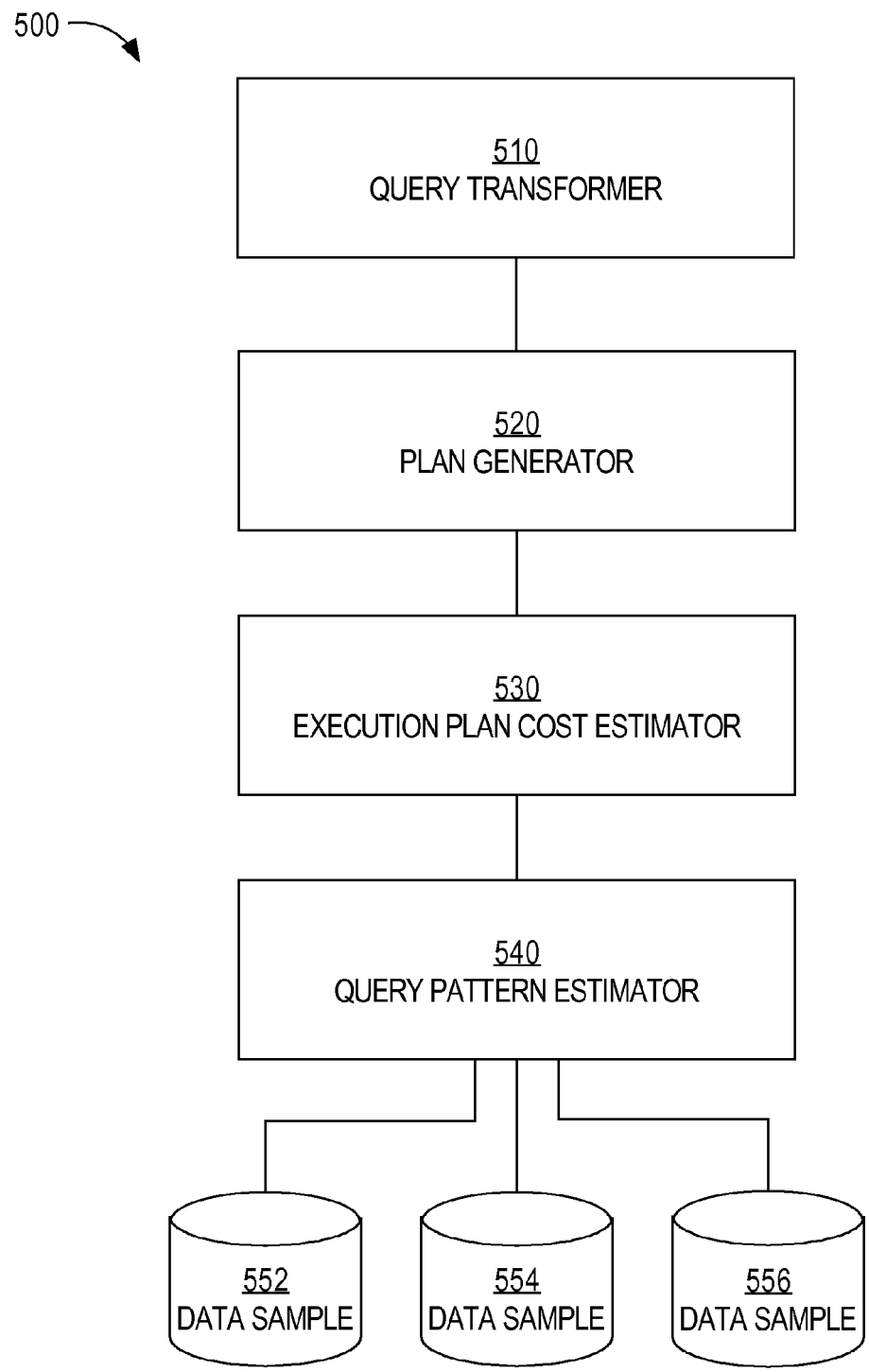
FIG. 5 is a block diagram that depicts an example graph query optimizer, in an embodiment.

FIG. 5 is a block diagram that depicts an example graph query optimizer 500, in an embodiment. Graph query optimizer 500 includes a query transformer 510, a plan generator 520, an execution plan cost estimator 530, a query pattern estimator 540, and data samples 552-556. Each of elements 510-540 may be implemented in software, hardware, or a combination of software and hardware. If implemented in software, elements 510-540 may be part of the same software component or may be different software components that are configured to interact with at least one other element. Similarly, if implemented in hardware, elements 510-540 may be implemented on the same device or on different devices that are communicatively coupled to at least one other device.

Query transformer 510 is configured to receive and process a graph query, such as a SPARQL query. Query transformer 510 transforms the graph query (or a copy thereof) into a format that plan generator 520 is configured to recognize and process. Thus, the transformed query that query transformer 510 generates may include labels and/or structures that are not found in the original graph query. Similarly, the transformed query may exclude labels and/or references that are found in the original graph query.

Plan generator 520 receives the transformed query and generates multiple execution plans, each of which may be used to generate valid results for the original graph query. Plan generator 520 may generate all possible execution plans, such as all possible join permutations, including join order and join method. Alternatively, plan generator 520 may generate a subset of all possible execution plans. For example, plan generator 520 may generate a maximum of ten execution plans for each transformed query it receives, regardless of the number of possible execution plans that may be generated. Plan generator 520 sends each execution plan to execution plan cost estimator 530.

In response to receiving an execution plan from plan generator 520, execution plan cost estimator 530 identifies multiple query patterns in the execution plan. Execution plan cost estimator 530 sends the query patterns to query pattern estimator 540.

In response to receiving the query patterns, query pattern estimator 540 determines a cardinality of each query pattern relative to data sample 552. This determination may involve generating a key for each query pattern and retrieving, from the a key-value store (e.g., K/V store 140), based on the key, (a) a set of one or more key-value pairs that satisfy the key or (b) a value that indicates the number of key-value pairs in the set.

Query pattern estimator 540 determines whether enough information is received for each query pattern relative to data sample 552. If not (e.g., less than three key-value-pairs satisfy one or more query patterns), then query pattern estimator 540 determines a cardinality of each query pattern relative to data sample 554 (or, alternatively, each query pattern for which not enough information was received previously). Query pattern estimator 540 may maintain a timer to determine how long it took to receive results from the data sample 552 before proceeding to data sample 554. If the time required to determine the cardinality of query patterns relative to data sample 552 was above a certain threshold, then query pattern estimator 540 returns the cardinalities of each query pattern to execution plan cost estimator 530, which estimates a cost of an execution plan based on the query pattern cardinalities. The same set of query pattern cardinalities may be used to determine the cost of multiple execution plans that are based on the same transformed query.

Example Graph Data and Data Samples

The following example illustrates another possible real-world scenario for storing and querying graph data. In this example, a key-value store stores billions of RDF triples representing data from NASA crew and expeditions. Four data samples of that RDF triples data set are maintained as follows:

Subset 1 has a sampling ratio of 0.01%
Subset 2 has a sampling ratio of 0.1%
Subset 3 has a sampling ratio of 1%
Subset 4 has a sampling ratio of 5%

Later, a graph query is received, which query requires retrieving all information associated to the Apollo 11 expedition such as crew, launching date, and lunar landing date. An example of such a graph query using SPARQL is as follows:

```
select ?crewName ?crewPosition ?launchingDate ?lunarLandingDate
where {
    (1)<nasa:Apollo11> <rdf:type> <nasa:LunarExpedition>
    (2)<nasa:Apollo11> <nasa:crewMember> ?crewMember
    (3)<nasa:Apollo11> <nasa:launchingDate> ?launchingDate
    (4)<nasa:Apollo11> <nasa:lunarLandingDate> ?launchingDate
    (5)?crewMember <foaf:name> ?crewName
    (6)?crewMember <nasa:jobPosition> ?crewPosition
}
```

Using a graph query optimizer, all query patterns are analyzed as all query patterns are connected into a single graph pattern. Each query pattern (identified with numbers 1-6) is processed (or run) against the Subset 1 (i.e., a sampling ratio of 0.01%) using the most relevant "index", i.e., the stored structural (key) pattern out of the six structural patterns described previously (e.g., GPSO, SOGP, SGOP, etc.). Once all query patterns are executed and statistics are generated with respect to the Subset 1, the query patterns may be run against the Subset 2 (i.e., sampling ratio of 0.1%) and so on until the allocated cost estimation time is reached or until sufficient statistics are gathered. For example, the following statistics may have been retrieved:

| Query Pattern | Subset 1 Sampling Ratio 0.01% | Subset 2 Sampling Ratio 0.1% | Subset 3 Sampling Ratio 1% |
|---|---|---|---|
| 1 | 0 records returned | 0 records returned | 1 record returned |
| 2 | 0 | 1 | 5 |
| 3 | 0 | 0 | 1 |
| 4 | 0 | 0 | 0 |
| 5 | 10 | 50 | 90 |
| 6 | 5 | 13 | 40 |

Running a query pattern against small data samples is more likely to give inaccurate results than if the query pattern is run against larger data samples. Thus, if the graph query optimizer uses the statistics obtained from Subset 1, then the graph query optimizer may generate and select an execution plan that may not be the one with an optimal performance (relative to the other possible execution plans). Poor plan selection may occur because query patterns in the graph query may be more selective and no RDF triples in the data sample are a match. Statistics from Subset 3 are meaningful enough to select an optimal query execution plan.

Based on these statistics, query patterns may be sorted and the cost of join operations (e.g., hash join, nested loop join, etc.) are calculated. The graph query optimizer determines the order of the query patterns as well as the join methods to use. If more time is available for optimization, then additional query plans may be generated and their respective costs measured using the data sample statistics obtained. By generating multiple plans and calculating their costs using data samples, the graph query optimizer is capable of providing an optimal (or near optimal) execution plan to execute the graph query.

Persistent Data Samples in Non-Graph Context

Using persistent data samples is not limited to any particular data model context. For example, persistent data samples may be used in a non-graph context, such as a relational context, where the data samples are rows from one or more tables.

Figure 6:
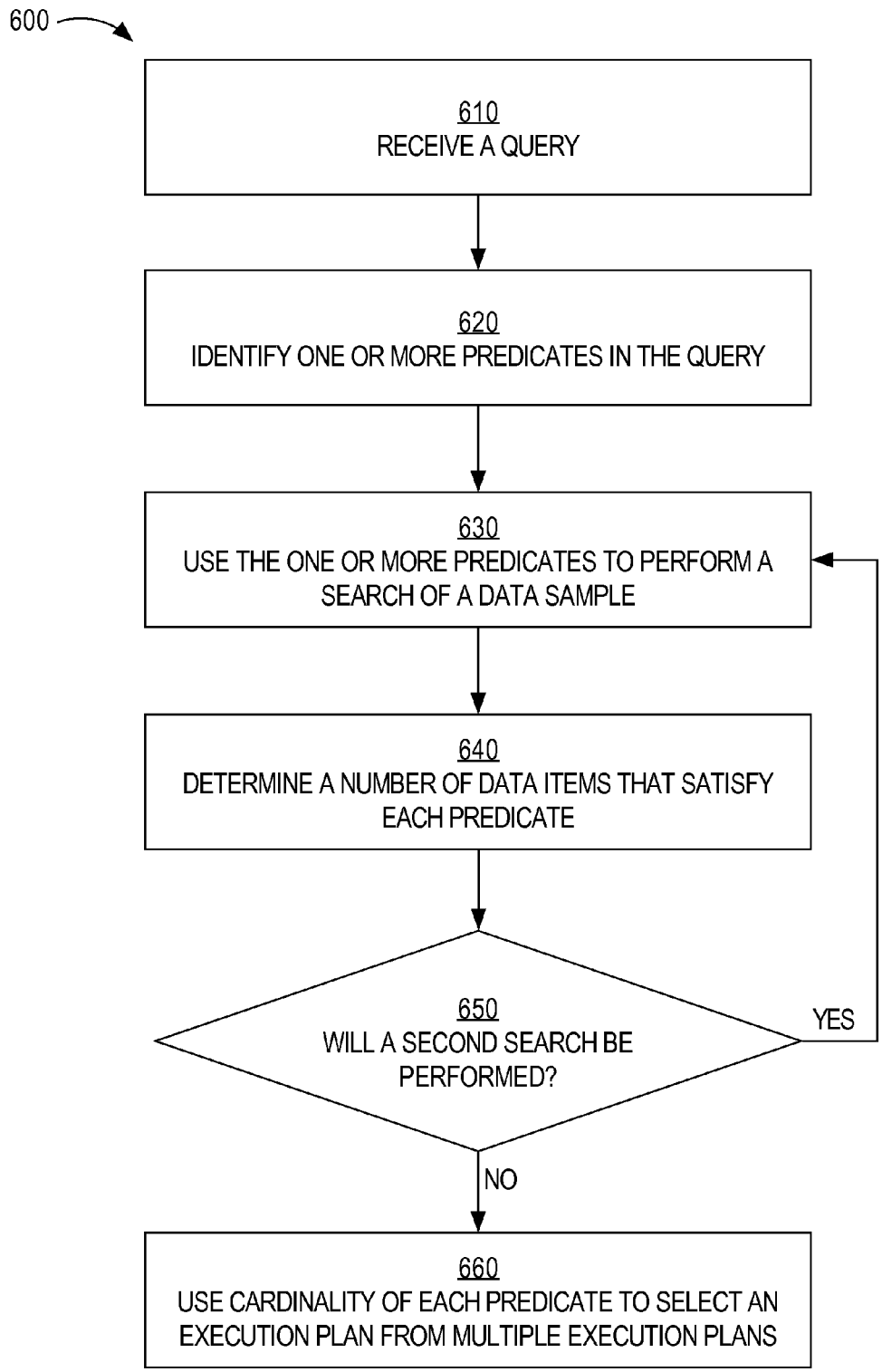
FIG. 6 is a flow diagram that depicts a process for using persistent data samples to select a query execution plan, in an embodiment.

FIG. 6 is a flow diagram that depicts a process 600 for using persistent data samples to select a query execution plan, in an embodiment. Process 600 may be performed by server node 130.

At block 610, a query is received. An example query is a SQL query or a query that conforms to the SQL language.

At block 620, one or more predicates are identified in the query. A predicate is a condition on data that belongs to a certain data object. For example, "age>42" may be a predicate on the "Age" column of an "Employee" table. If multiple predicates are identified in the query, then each predicate may correspond to different data objects or to the same data object. For example, in addition to the age predicate example above, another example predicate may be "DepartmentName=Finance" on the "DepartmentName" column of a "Department" table.

At block 630, a search is performed relative to one or more first data samples. If multiple predicates of a query correspond to different data objects, then the first search includes at least (1) a search for data items, in a first data sample of a first data object, that satisfy a first predicate and (2) a search for data items, in a first data sample of a second data object, that satisfy a second predicate.

At block 640, a number of data items that satisfy each predicate in the query is determined. If the query includes multiple predicates, then block 640 may involve determining a number of data items for each predicate in the query.

At block 650, it is determined whether a second search will be performed. This determination may be based on one or more criteria, such as the time and/or cardinality criteria described previously. If it is determined that a second search will not be performed, then process 600 proceeds to block 660, where the cardinality of each predicate is used to select an execution plan from among a plurality of execution plans for the query. Otherwise, process 600 proceeds to block 630, where a second search is performed.

A second iteration of block 630 may involve the same predicates used in the first iteration of block 630 or may involve less predicates than were used in the first iteration of block 630. For example, a query includes two predicates and the first search resulted in (1) determining that more than a threshold number of data items in a data sample satisfied one of the predicates (a "first predicate") and (2) determining that less than the threshold number of data items in the data sample satisfied the other predicate (a "second predicate"). Thus, a second search might involve the second predicate and not the first predicate.

If the first iteration of block 630 was performed against a single first data sample, then the second iteration of block 630 is performed against a second data sample (1) that is different than the data sample that was used in the first iteration of block 630 (2) but that is based on the same data object as the first data sample. The second data sample may be the same size as or larger than the first data sample. For example, if there are samples S1, S2, and S3 of data object DO, then the first iteration of block 630 may be against S1 and the second iteration of block 630 may be against S2.

If the first iteration of block 630 was performed using multiple data samples of different data objects (e.g., sample SA1 of data object DOA and sample SB1 of data object DOB), then the second iteration of block 630 may be performed against one or more different data samples of the different data objects. For example, the second iteration may be against SA2 of DOA and against SB2 of DOB. As another example, if the predicate that was applied against SA1 yielded sufficient results, then the second iteration of block 630 may be performed only against SB2 and not any sample of DOA.

A second iteration of block 640 is then performed. Thus, a number of data items that satisfy each predicate used during the second iteration of block 630 is determined.

A second iteration of block 650 is then performed, the one or more criteria used during the second iteration may be the same as or different than the one or more criteria used during the first iteration of block 650. For example, if one or more cardinality criteria are used as the one or more criteria in the first iteration, then the one or more cardinality criteria used in the second iteration may be different. For example, if a first threshold of ten data items is used in the first iteration, then a second threshold of fifteen data items is used in the second iteration.

Process 600 may proceed to block 660 or may return to block 630 for a third iteration. If there are only two data samples for a particular data object that is the subject of a search and blocks 630-640 have already been performed twice for the same predicate, then process 600 may end, even before performing block 650 since a search of a third data sample of the particular data object is not possible or practical.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
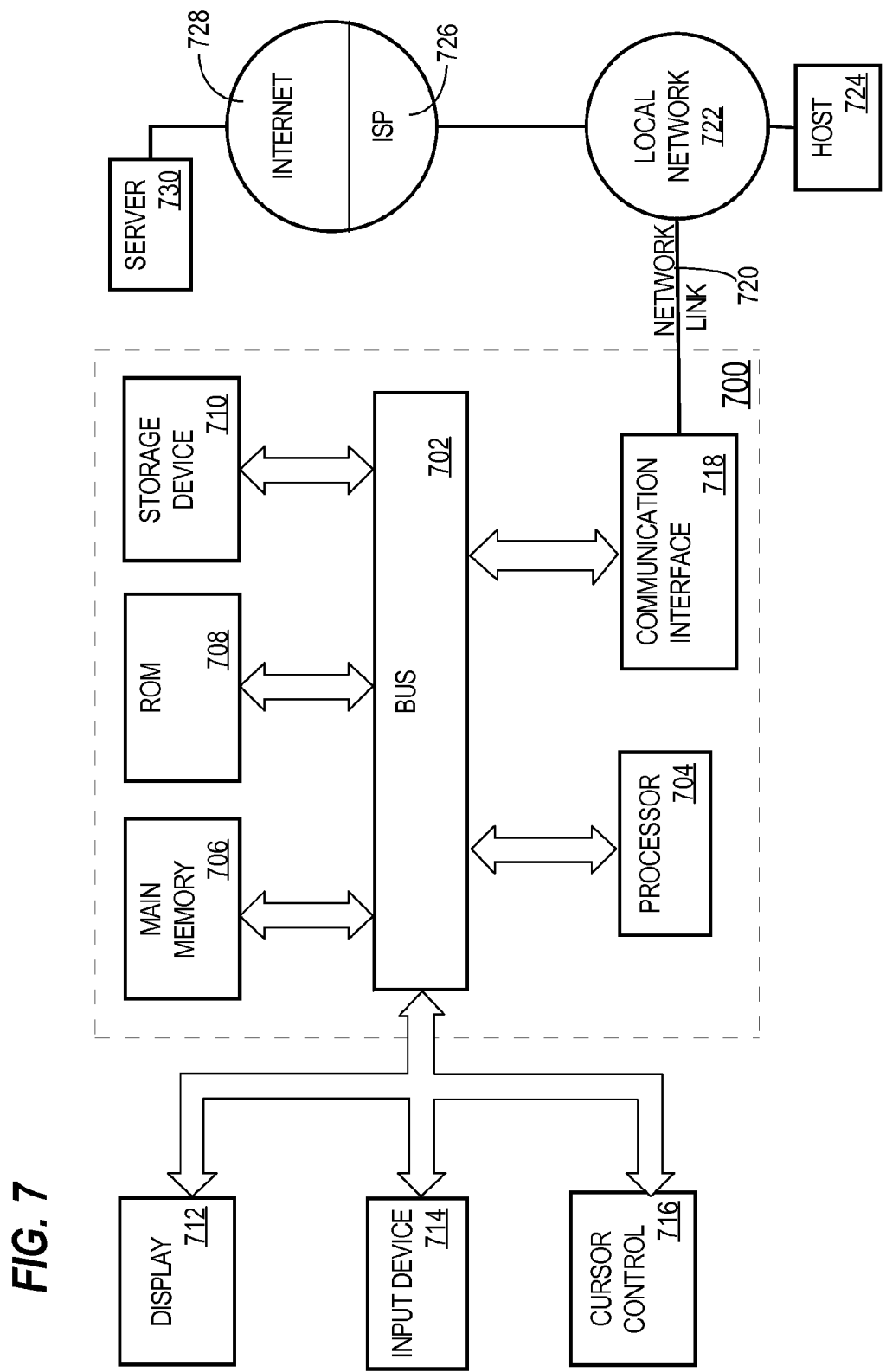
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more storage media storing instructions which, when executed by one or more processors, cause:
    in response to receiving a query that includes one or more graph query patterns:
        processing the one or more graph query patterns against a first data set of a plurality of data sets, each of which is a subset of a particular data set in a key-value store, wherein processing the one or more graph query patterns comprises processing a particular graph query pattern against the first data set;
        identifying, for the query, first results that are based on the one or more graph query patterns being processed against the first data set;
        determining, for the query, based on one or more criteria, whether to process at least one of the one or more graph query patterns against another data set of the plurality of data sets, wherein the one or more criteria includes a pre-defined period of time to identify the first results or a pre-defined number of results in the first results;
        in response to determining to process at least one of the one or more graph query patterns against another data set, processing, for the query, one or more of the one or more graph query patterns against a second data set of the plurality of data sets to produce second results, wherein processing the one or more of the one or more graph query patterns comprises processing the particular graph query pattern against the second data set, wherein the second data set is different than the first data set;
        based on the second results, determining how to process the query against the particular data set, wherein determining how to process the query against the particular data set comprises selecting an execution plan from among a plurality of execution plans based on the second results.

2. The one or more storage media of claim 1, wherein the second data set is larger than the first data set.

3. The one or more storage media of claim 1, wherein the instructions, when executed by the one or more processors, further cause, prior to receiving the query, generating the plurality of data sets based on the particular data set.

4. The one or more storage media of claim 1, wherein the one or more criteria includes the pre-defined period of time to identify the first results.

5. The one or more storage media of claim 1, wherein the one or more criteria includes the pre-defined number of results in the first results.

6. The one or more storage media of claim 5, wherein the first results indicate a cardinality, relative to the first data set, of each graph query pattern of the one or more graph query patterns.

7. The one or more storage media of claim 1, wherein the instructions, when executed by the one or more processors, further cause, after identifying the first results and prior to causing the one or more graph query patterns to be processed against the second data set, causing the one or more graph query patterns to be processed against a third data set, of the plurality of data sets, that is different than the first data set and the second data set.

8. The one or more storage media of claim 7, wherein:
    the one or more criteria are one or more first criteria;
    the instructions, when executed by the one or more processors, further cause, prior to causing the one or more graph query patterns to be processed against the third data set, determining, based on one or more second criteria, whether to process at least one of the one or more graph query patterns against the second data set of the plurality of data sets.

9. The one or more storage media of claim 8, wherein the one or more first criteria are different than the one or more second criteria.

10. The one or more storage media of claim 9, wherein the one or more first criteria are of a first type, wherein the one or more second criteria are of a second type that is different than first type.

11. The one or more storage media of claim 7, wherein:
    the first results indicate a first cardinality, relative to the first data set, of the particular graph query pattern;

the second results indicate a second cardinality, relative to the second data set, of the particular graph query pattern;

the instructions, when executed by the one or more processors, further cause:

identifying, for the query, third results that are based on the one or more graph query patterns being processed against the fourth data set;

performing a comparison between the third results and the first results;

determining whether to process at least one of the one or more graph query patterns against the second data set comprises determining, based on the comparison between the third results and the first results, whether to process at least one of the one or more graph query patterns against the second data set.

12. The one or more storage media of claim 1, wherein:
the one or more graph query patterns are one or more first graph query patterns;
the one or more of the one or more graph query patterns are one or more second graph query patterns that are different than the one or more first query patterns.

13. The one or more storage media of claim 1, wherein: the particular data set comprises multiple Resource Description Framework (RDF) triples.

14. The one or more storage media of claim 13, wherein the one or more graph query patterns includes a first graph query pattern that includes two or more of a first subject value, a first predicate value, or a first object value.

15. The one or more storage media of claim 14, wherein the first subject value or the first object value is identified by a Uniform Resource Identifier (URI).

16. The one or more storage media of claim 14, wherein the one or more graph query patterns includes a second graph query pattern that includes only one of a second subject value, a second predicate value, or a second object value.

17. The one or more storage media of claim 13, wherein the query is formatted in an RDF query language.

18. The one or more storage media of claim 1, wherein:
the one or more graph query patterns are a plurality of graph query patterns that includes a first graph query pattern and a second graph query pattern;
processing the one or more graph query patterns against the first data set comprises processing the first graph query pattern and the second graph query pattern against the first data set;
the instructions, when executed by the one or more processors, further cause determining to process the first graph query pattern against the second data set and determining to not process the second graph query pattern against the second data set;
processing one or more of the one or more graph query patterns against the second data set comprises processing the first graph query pattern against the second data set and not processing the second graph query pattern against the second data set.

19. A method comprising:
in response to receiving a query that includes one or more query patterns:
processing the one or more graph query patterns against a first data set of a plurality of data sets, each of which is a subset of a particular data set in a key-value store, wherein processing the one or more graph query patterns comprises processing a particular graph query pattern against the first data set;

identifying, for the query, first results that are based on the one or more graph query patterns being processed against the first data set;

determining, for the query, based on one or more criteria, whether to process at least one of the one or more graph query patterns against another data set of the plurality of data sets, wherein the one or more criteria includes a pre-defined period of time to identify the first results or a pre-defined number of results in the first results;

in response to determining to process at least one of the one or more graph query patterns against another data set, processing, for the query, one or more of the one or more graph query patterns against a second data set of the plurality of data sets to produce second results, wherein processing the one or more of the one or more graph query patterns comprises processing the particular graph query pattern against the second data set, wherein the second data set is different than the first data set;

based on the second results, determining how to process the query against the particular data set, wherein determining how to process the query against the particular data set comprises selecting an execution plan from among a plurality of execution plans based on the second results;

wherein the method is performed by one or more computing devices.

20. The method of claim 19, wherein the second data set is larger than the first data set.

21. The method of claim 19, wherein:
the one or more graph query patterns are a plurality of graph query patterns that includes a first graph query pattern and a second graph query pattern;
processing the one or more graph query patterns against the first data set comprises processing the first graph query pattern and the second graph query pattern against the first data set;
the method further comprising determining to process the first graph query pattern against the second data set and determining to not process the second graph query pattern against the second data set;
processing one or more of the one or more graph query patterns against the second data set comprises processing the first graph query pattern against the second data set and not processing the second graph query pattern against the second data set.

22. The method of claim 19, further comprising, after identifying the first results and prior to causing the one or more graph query patterns to be processed against the second data set, causing the one or more graph query patterns to be processed against a third data set, of the plurality of data sets, that is different than the first data set and the second data set.

23. The method of claim 22, wherein:
the first results indicate a first cardinality, relative to the first data set, of the particular graph query pattern;
the second results indicate a second cardinality, relative to the second data set, of the particular graph query pattern;
the method further comprising:
identifying, for the query, third results that are based on the one or more graph query patterns being processed against the fourth data set;
performing a comparison between the third results and the first results;

determining whether to process at least one of the one or more graph query patterns against the second data set comprises determining, based on the comparison between the third results and the first results, whether to process at least one of the one or more graph query patterns against the second data set.

\* \* \* \* \*

UNITED STATES PATENT AND TRADEMARK OFFICE
CERTIFICATE OF CORRECTION

PATENT NO. : 9,798,772 B2
APPLICATION NO. : 13/893047
DATED : October 24, 2017
INVENTOR(S) : Wu et al.

It is certified that error appears in the above-identified patent and that said Letters Patent is hereby corrected as shown below:

On the Title Page

On page 2, Column 2, under Other Publications, Line 4, delete "Edinburh," and insert -- Edinburgh, --, therefor.

In the Specification

In Column 14, Line 32, delete "the a" and insert -- a --, therefor.

Signed and Sealed this
Twenty-sixth Day of June, 2018

Andrei Iancu
*Director of the United States Patent and Trademark Office*